(12) United States Patent
Ishikawa

(10) Patent No.: US 8,442,014 B2
(45) Date of Patent: May 14, 2013

(54) WIRELESS BASE STATION APPARATUS AND WIRELESS COMMUNICATION METHOD

(75) Inventor: Kazuki Ishikawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 322 days.

(21) Appl. No.: 13/059,369

(22) PCT Filed: Aug. 27, 2009

(86) PCT No.: PCT/JP2009/064966
§ 371 (c)(1),
(2), (4) Date: Feb. 16, 2011

(87) PCT Pub. No.: WO2010/024335
PCT Pub. Date: Mar. 4, 2010

(65) Prior Publication Data
US 2011/0149923 A1   Jun. 23, 2011

(30) Foreign Application Priority Data

Aug. 27, 2008 (JP) .................................. 2008-217751
Aug. 28, 2008 (JP) .................................. 2008-219919

(51) Int. Cl.
*H04J 3/00* (2006.01)

(52) U.S. Cl.
USPC ........................................................ 370/336

(58) Field of Classification Search .................. None
See application file for complete search history.

(56) References Cited

U.S. PATENT DOCUMENTS

| | | | | |
|---|---|---|---|---|
| 6,112,088 A | * | 8/2000 | Haartsen | 455/437 |
| 7,860,045 B2 | * | 12/2010 | Holtzman et al. | 370/326 |
| 2006/0126578 A1 | | 6/2006 | Nagai | |
| 2011/0122852 A1 | * | 5/2011 | Yu et al. | 370/337 |

FOREIGN PATENT DOCUMENTS

| | | |
|---|---|---|
| JP | A-05-336061 | 12/1993 |
| JP | A-09-172674 | 6/1997 |
| JP | A-2006-049954 | 2/2006 |
| JP | A-2006-173662 | 6/2006 |
| JP | A-2007-096985 | 4/2007 |
| JP | A-2007-235985 | 9/2007 |

OTHER PUBLICATIONS

Japanese Office Action issued in Application No. 2010-526760; Dated Apr. 17, 2012 (With Translation).
International Search Report issued in Application No. PCT/JP2009/064966; Dated Nov. 2, 2009 (With Translation).

* cited by examiner

*Primary Examiner* — Clemence Han

(74) *Attorney, Agent, or Firm* — Oliff & Berridge, PLC

(57) ABSTRACT

A wireless base station apparatus for performing wireless communication with a plurality of wireless communication apparatuses includes a communication processing unit for allocating wireless resources to the wireless communication apparatuses to perform wireless communication, a statistics processing unit for obtaining information related to communication status of the wireless communication apparatuses in wireless communication, and an intermittent arrangement determination unit for detecting a wireless communication apparatus to be allocated with wireless resource at intervals of a predetermined number of communication frames based on the information obtained. The communication processing unit intermittently allocates the same time slot to a plurality of wireless communication apparatuses detected by the intermittent arrangement determination unit at intervals of a predetermined number of communication frames.

12 Claims, 9 Drawing Sheets

WIRELESS BASE STATION APPARATUS AND WIRELESS COMMUNICATION METHOD

CROSS REFERENCE TO RELATED APPLICATIONS

This application claims priority to and the benefit of Japanese Patent Application No. 2008-217751 (filed on Aug. 27, 2008) and Japanese Patent Application No. 2008-219919 (filed on Aug. 28, 2008), the entire contents of which are incorporated herein by reference.

TECHNICAL FIELD

The present invention relates to wireless base station apparatuses for performing wireless communication with a plurality of wireless communication apparatuses and wireless communication methods of wireless base station apparatuses.

BACKGROUND ART

For example, in a wireless communication system including a wireless base station apparatus and a wireless communication apparatus that employ TDMA (Time Division Multiple Access) scheme performs wireless communication by dividing a frame on a time basis and using a pair of a transmission time slot and a reception time slot. The time slot is an example of wireless resource. FIG. 9 shows an exemplary structure of a communication frame of the TDMA scheme. A pair of the transmission time slot and the reception time slot is allocated to each wireless communication apparatus 300E requesting for communication, such that respective channels are simultaneously established between a single wireless base station apparatus and the plurality of wireless communication apparatuses.

With the above wireless communication system, the wireless base station apparatus and the wireless communication apparatus perform the wireless communication by occupying the channel (time slot in each communication frame) regardless of contents of an application used by a user. That is, it is not possible to increase the number of users a base station can accommodate. Although there are different user ranks according to contracts between the users and a carrier, the above wireless communication system cannot secure time slots and thus cannot provide a desired service to a high grade (rank) user who is supposed to be provided with a high quality service with less voice interruption and the like. As a method to solve such a problem, there is suggested a wireless communication system as a conventional art which allows simultaneous access by mobile stations more than the number of slots per frame (see Patent Document 1).

In addition, since the above wireless communication system has a limitation on an amount of data transmittable in a single time slot, it may not possible to appropriately receive data necessary for processing in the wireless communication such as streaming which requires transmission of bulky data.

Therefore, there is suggested a scheme to increase transmittable and receivable data amounts by performing the wireless communication using a plurality of time slots per frame (see Patent Document 2).

Prior Art Documents

Patent Documents

Patent Document 1: Japanese Patent Laid-Open No. 09-172674

Patent Document 2: Japanese Patent Laid-Open No. 05-336061

SUMMARY OF INVENTION

Technical Problem

However, Patent Document 1 has no description about a scheme to appropriately allocate time slots if a user desires a predetermined communication rate in advance. For example, if the time slot is already allocated intermittently to a wireless communication apparatus for such as a half rate communication which allocates time slots to each user at half the frequency of allocation to a single user so as to communicate at half of a normal transmission rate (full rate) or by a quarter rate communication which allocates time slots to each user at quarter the frequency of allocation to the single user, it is not considered to combine these communications. Therefore, there has been a problem not to be able to use the wireless resource efficiently.

In addition, the technique described in Patent Document 2 can perform the wireless communication by using a plurality of time slots only if there are open time slots, and thus cannot perform wireless communication by using a plurality of time slots when there is no allocatable time slot. Therefore, there has been a problem not to be able to perform the wireless communication with securing an adequate data amount according to the application to use.

An object of the present invention is to provide a wireless base station apparatus and a wireless communication method that, in order to efficiently utilize wireless resources in the wireless communication with a plurality of wireless communication apparatuses, allocate wireless resources at relatively the same position in respective communication frames to the plurality of wireless communication apparatuses, in consideration of communication status of the wireless communication apparatuses.

Another object of the present invention is to provide a wireless base station apparatus and a wireless communication method that, even if there is no allocatable wireless resource, are capable of performing the wireless communication retaining the adequate data amount according to an application to use.

Solution to Problem

According to a first aspect of the present invention, a wireless base station apparatus for performing wireless communication with a plurality of wireless communication apparatuses includes: a wireless resource allocation unit for allocating wireless resources (for example, time slots, resource blocks, subcarriers and the like) to the wireless communication apparatuses to perform wireless communication; an information obtaining unit for obtaining information related to communication status of the wireless communication apparatuses in wireless communication; and a detection unit for detecting a wireless communication apparatus as a target to allocate wireless resource at intervals of a predetermined number of communication frames based on the information obtained by the information obtaining unit, wherein the wireless resource allocation unit intermittently allocates same wireless resource at intervals of a predetermined number of communication frames to a plurality of wireless communication apparatuses detected by the detection unit.

It is preferred that the wireless resource allocation unit, when receiving a request for channel establishment from the wireless communication apparatus, allocates wireless resource at intervals of a predetermined number of communication frames to the wireless communication apparatus based on a communication type of the wireless communication apparatus. Additionally, it is preferred that the wireless resource allocation unit, in accordance with a specified communication rate included in the communication type, allocates the wireless resource to the wireless communication apparatus at the specified communication rate. Moreover, it is preferred that the wireless resource allocation unit allocates same wireless resource to a plurality of wireless communication apparatuses of the same communication type.

It is preferred that, the wireless base station apparatus further includes a modulation scheme control unit for changing a modulation method of wireless communication to be performed with wireless resource allocated to a modulation method capable of obtaining a communication rate higher than that of a modulation method of wireless communication before allocation of the wireless resource, if the wireless resource allocation unit allocates the wireless resource at intervals of a predetermined number of communication frames to the wireless communication apparatus in wireless communication.

According to a second aspect of the present invention, a wireless communication method of a wireless base station apparatus for performing wireless communication with a plurality of wireless communication apparatuses includes the steps of: allocating wireless resources to the wireless communication apparatuses to perform wireless communication; obtaining information related to communication status of the wireless communication apparatuses in wireless communication; detecting a wireless communication apparatus to be allocated with wireless resource at intervals of a predetermined number of communication frames based on the information obtained at the step of obtaining information; and controlling so as to intermittently allocate same resource at intervals of a predetermined number of communication frames to a plurality of wireless communication apparatuses detected at the step of detection.

According to a third aspect of the present invention, a wireless base station apparatus for performing wireless communication with a plurality of wireless communication apparatuses includes: a first wireless resource allocation unit for allocating wireless resources included in a communication frame to the wireless communication apparatuses; a wireless communication control unit for performing the wireless communication with the wireless communication apparatuses by using the wireless resources allocated by the first wireless resource allocation unit; a communication status information obtaining unit for obtaining information related to communication status of the wireless communication apparatuses currently in communication when the wireless communication is performed by the wireless communication control unit; a first wireless communication apparatus detection unit for detecting a first wireless communication apparatus as a target of intermittent opening of the wireless resource based on the information obtained by the communication status information obtaining unit; a wireless resource allocation control unit for intermittently opening the wireless resource at intervals of a predetermined number of communication frames for the first wireless communication apparatus detected by the first wireless communication apparatus detection unit; a second wireless communication apparatus detection unit for detecting a second wireless communication apparatus allocated with wireless resource adjacent to the wireless resource opened by the wireless resource allocation control unit; a communication information obtaining unit for obtaining information indicating a communication type of the second wireless communication apparatus detected by the second wireless communication apparatus detection unit and communication data amount information indicating a communication data amount of the second wireless communication apparatus; and a second wireless resource allocation unit for allocating the wireless resource opened to the second wireless communication apparatus if each of the information obtained by the communication information obtaining unit satisfies a predetermined condition.

It is preferred that the predetermined condition is satisfied if, at least, the communication type is for performing communication with a certain communication data amount. Additionally, it is preferred that the predetermined condition is satisfied if, at least, the communication type is for performing communication with a certain communication data amount and the communication data amount of the second wireless communication apparatus is less than the certain communication data amount.

It is preferred that the communication type for performing communication with a certain communication data amount is voice communication. Alternatively, it is preferred that the communication type for performing communication with a certain communication data amount is real-time broadcasting.

According to a fourth aspect of the present invention, a wireless communication method of a wireless base station apparatus for performing wireless communication with a plurality of wireless communication apparatus includes the steps of: allocating wireless resources included in a communication frame to the wireless communication apparatuses; performing the wireless communication with the wireless communication apparatuses by using the wireless resources allocated; obtaining information related to communication status of the wireless communication apparatuses currently in communication when the wireless communication is performed; detecting a first wireless communication apparatus as a target of intermittent opening of the wireless resource based on the information related to the communication status obtained; intermittently opening the wireless resource at intervals of a predetermined number of communication frames for the first wireless communication apparatus detected; detecting a second wireless communication apparatus allocated with wireless resource adjacent to the wireless resource opened; obtaining information indicating a communication type of the second wireless communication apparatus detected and communication data amount information indicating a communication data amount of the second wireless communication apparatus; and allocating the wireless resource opened to the second wireless communication apparatus if each of the information obtained satisfies a predetermined condition.

Effect of the Invention

According to the present invention, a wireless base station apparatus, when performing wireless communication with a plurality of wireless communication apparatuses, can allocate wireless resources at a relatively same position in respective communication frames to the plurality of wireless communication apparatuses in consideration of the communication status of the wireless communication apparatuses, and thereby it can efficiently utilize the wireless resources.

In addition, according to the present invention, if there is a wireless communication apparatus under a good environment for the wireless communication, the wireless base station apparatus restricts allocation of the wireless resource to such wireless communication apparatus and, while maintaining the wireless communication with this wireless communication apparatuses, allocates opened wireless resources to another wireless communication apparatus currently connected, which enables the wireless communication apparatus currently connected to perform the wireless communication with securing a necessary data amount according to an application to use.

DESCRIPTION OF EMBODIMENTS

Embodiments of the present invention will be described with reference to the accompanying drawings.

First Embodiment

Figure 1:
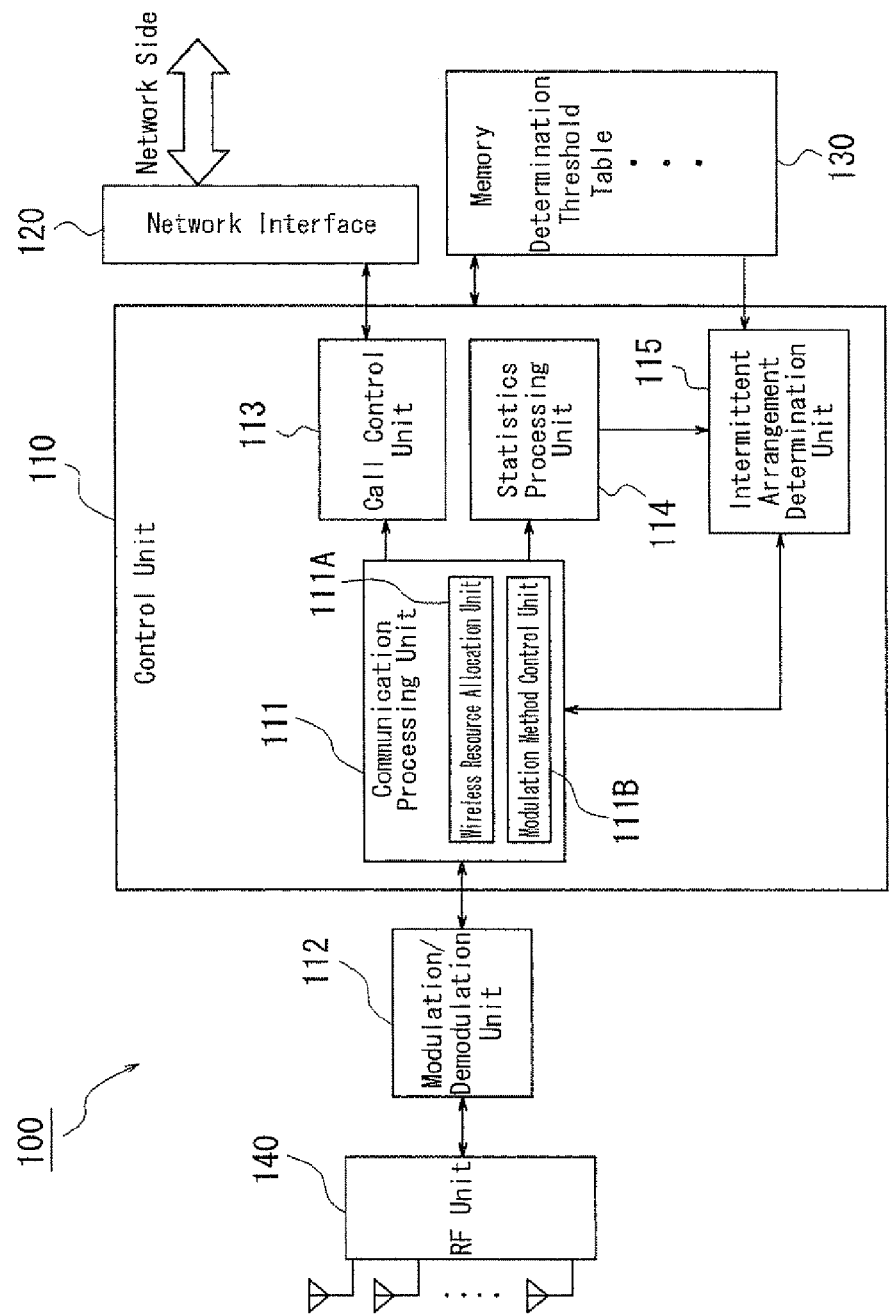
FIG. 1 is a functional block diagram illustrating a schematic constitution of a wireless base station apparatus according to a first embodiment of the present invention.

FIG. 1 is a functional block diagram illustrating a schematic constitution of a wireless base station apparatus according to a first embodiment of the present invention. A wireless base station apparatus 100 shown in FIG. 1 performs wireless communication with a plurality of wireless communication apparatuses by Time Division Multiple Access scheme. The wireless base station apparatus 100 has a control unit 110, a modulation/demodulation unit 112, a network interface 120 for connecting to an external network, a memory 130 for storing a table of determination threshold and an RF unit 140 including a switch (SW) to switch between transmission and reception. The control unit 110 has a communication processing unit 111, a call control unit 113, a statistics processing unit (information obtaining unit) 114 and an intermittent arrangement determination unit (detection unit) 115.

The modulation/demodulation unit 112 modulates transmission signals to wireless communication apparatuses (not shown) and demodulates reception signals from the wireless communication apparatuses. The call control unit 113 performs call control in order to establish wireless channels with the wireless communication apparatuses. In wireless communication in time slots allocated by the communication processing unit 111, the statistics processing unit 114, based on wireless signals from the wireless communication apparatuses, obtains information related to communication status of the wireless communication. The intermittent arrangement determination unit 115 detects a wireless communication apparatus to which time slots can be allocated at intervals of a predetermined number of communication frames based on the information obtained by the statistics processing unit 114.

The communication processing unit 111 is provided with a wireless resource allocation unit 111A and a demodulation method control unit 111B. The wireless resource allocation unit 111A allocates time slots included in each communication frame to a plurality of wireless communication apparatuses. Also, when transmitting wireless signals to the wireless communication apparatus detected by the intermittent arrangement determination unit 115 and thus allocated with the time slot intermittently, the wireless resource allocation unit 111A opens time slots allocated to the wireless communication apparatus detected every a predetermined number of frames. The modulation method control unit 111B determines to change the modulation method in the time slot for performing the wireless communication with the wireless communication apparatus to another modulation method with more modulation multi-values than that of a current (before opening) modulation method. When determining to change the modulation method, the modulation method control unit 111B instructs the modulation/demodulation unit 112 to change the modulation method. Upon reception of such instruction from the modulation method control unit 111B, the modulation/demodulation unit 112 changes the modulation method in the time slot for performing the wireless communication with the wireless communication apparatus to the modulation method with more modulation multi-values than that of the current modulation method. Thereby, the wireless base station apparatus 100 can maintain a data rate necessary for the wireless communication with the wireless communication apparatus. In addition, upon request for channel establishment from a wireless communication apparatus, the wireless resource allocation unit 111A intermittently allocates time slots to the wireless communication apparatus based on the communication type (an application type, a user's contract grade (user rank) type, a necessary data rate (full rate, half rate, quarter rate) and the like) of the wireless communication apparatus.

Figure 2:
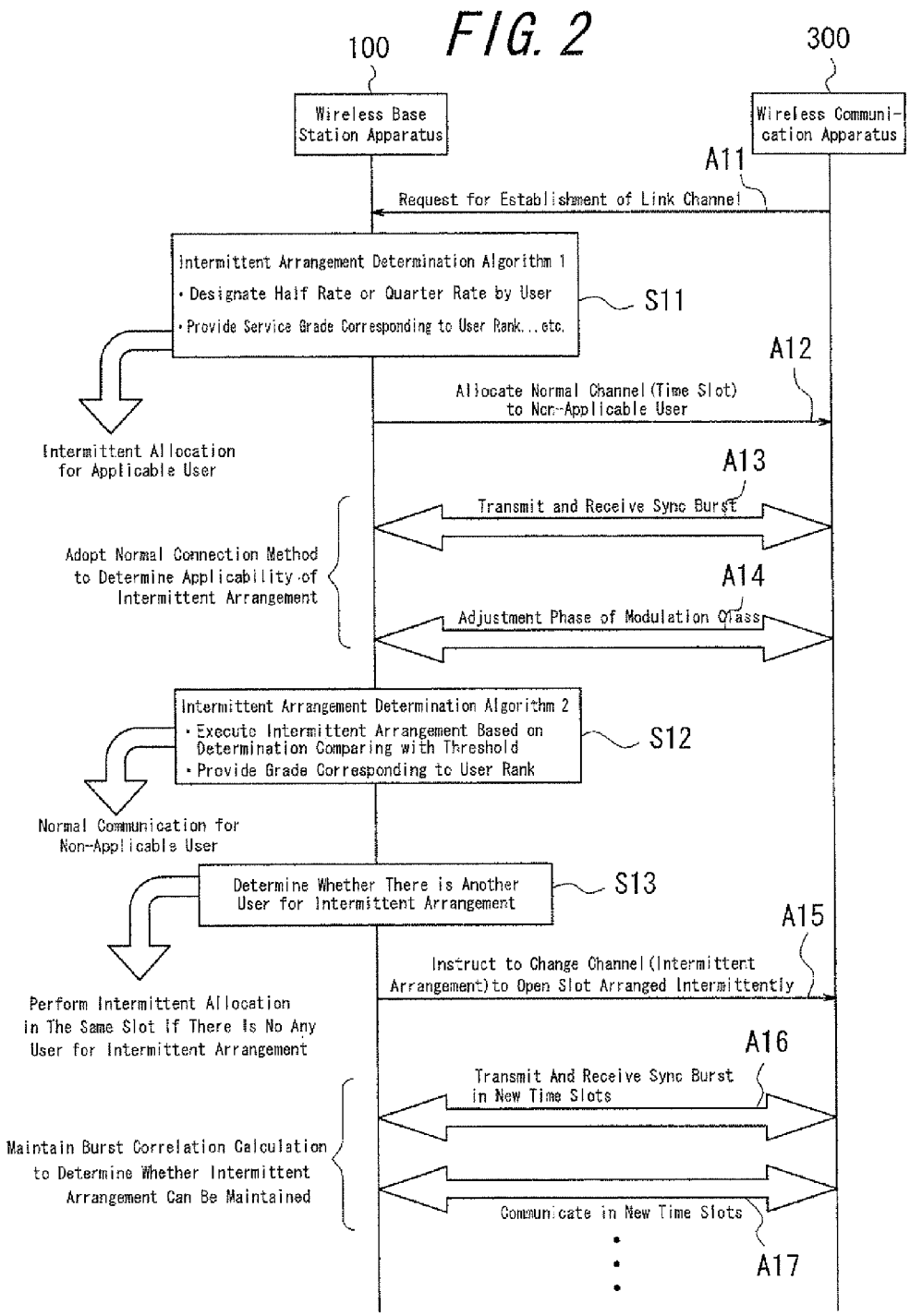
FIG. 2 is a sequence diagram illustrating operations of the wireless base station apparatus and a wireless communication apparatus.

FIG. 2 is a sequence diagram illustrating operations of the wireless base station apparatus and the wireless communication apparatus. First, a wireless communication apparatus (mobile station) 300 transmits a signal requesting establishment of a wireless channel (channel establishment request) to the wireless base station apparatus 100 (step A11). This channel establishment request contains the communication type such as the communication rate the wireless communication apparatus requests, the user rank and the like. The user rank is determined according to, for example, a charge and the number of contract year according to a contract between the user and a carrier. A user with a higher user rank is provided with a higher quality service without voice interruption and the like. Based on contents of the communication type obtained from the wireless communication apparatus 300, the wireless resource allocation unit 111A of the wireless base station apparatus 100, for example, intermittently allocates time slots at the half rate to a wireless communication apparatus if capable of performing a half rate communication while intermittently allocating time slots at the quarter rate to a wireless communication apparatus if capable of performing a quarter rate communication (step S11). The wireless resource allocation unit 111A allocates time slots at a normal rate (full rate) to a wireless communication apparatus (non-applicable user) which should not be intermittently allocated with the time slots. The call control unit 113 of the wireless base station apparatus 100 transmits an allocation signal of a wireless channel (time slot) to the wireless communication apparatus 300 (step A12). Next, the wireless base station apparatus 100 and the wireless communication apparatus 300 transmit and receive a sync burst signal on the channel (time slot) allocated (step A13).

Upon reception of the sync burst signal from the wireless communication apparatus 300, the statistics processing unit 114 of the wireless base station apparatus 100 obtains the information related to the communication status of wireless communication such as, for example, received power of the sync burst signals received, a fading speed, a frequency deviation and the like, and performs statistics processing. The intermittent arrangement determination unit 115 compares the information obtained by the statistics processing unit 114 with the determination threshold stored in the memory 130 in order to determine whether the wireless communication apparatus 300 can be intermittently allocated with time slots. That is, the intermittent arrangement determination unit 115 detects a wireless communication apparatus to be allocated with time slots (wireless resource) at intervals of a predetermined number of communication frames. In addition, the intermittent arrangement determination unit 115 determines the user rank of the wireless communication apparatus 300 (step S12). If it is determined at step S12 that the wireless communication apparatus is not capable of being intermittently allocated with time slots, the wireless base station apparatus 100 continues the communication at the normal rate. If it is determined at step S12 that the wireless communication apparatus is capable of being intermittently allocated with the time slot, the intermittent arrangement determination unit 115 further determines whether there is a wireless communication apparatus which, among the plurality of wireless communication apparatuses performing the wireless communication with the wireless base station apparatus 100, is already performing the communication in the time slots intermittently allocated (step S13). That is, the intermittent arrangement determination unit 115 determines whether there is an intermittent arrangement user performing the half rate communication or the quarter rate communication. If it is determined at step S13 that there is no user who is already intermittently allocated with time slots, the wireless resource allocation unit 111A intermittently allocates the same time slots to the wireless communication apparatus determined at step S12 as capable of being intermittently allocated with the time slots. That is, the wireless resource allocation unit 111A allocates the time slots at relatively same positions in respective communication frames to a plurality of wireless communication apparatuses sequentially.

Figure 3:
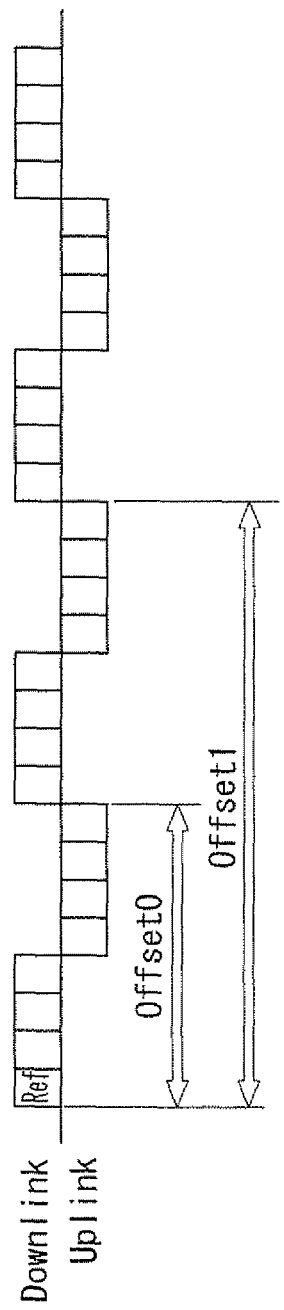
FIG. 3 is a diagram illustrating an offset setting.

If it is determined at step S13 that there is a wireless communication apparatus which is already performing the communication in time slots intermittently allocated, the wireless resource allocation unit 111A allocates the time slots, intermittently allocated already and open intermittently, to the wireless communication apparatus determined to be capable of being intermittently allocated with time slots at step S12. Then, the call control unit 113 instructs the wireless communication apparatus 300 as a target to change to a channel of the time slots already intermittently allocated (intermittently arranged time slot) (step A15). Next, the wireless base station apparatus 100 and the wireless communication apparatus 300 transmit and receive the sync burst signal in the time slots intermittently arranged (step A16). Then, the wireless base station apparatus 100 determines whether it is possible to maintain a state that the time slots are intermittently arranged. If it is determined that it is possible to maintain the state that the time slots are intermittently arranged, the wireless base station apparatus 100 and the wireless communication apparatus 300 start the communication in the time slots intermittently arranged (step A17). After that also, the statistics processing unit 114 continues to calculate burst correlation in order to determine whether it is possible to intermittently arrange the time slots. Here, allocation of the time slots intermittently arranged is described with reference to FIG. 3. The wireless resource allocation unit 111A, using a first time slot in a super frame as a reference, for example, specifies the number of frames offset from a reference frame including a reference time slot and a time slot number in the frame and notifies the wireless communication apparatus about the time slot to use.

Figure 4:
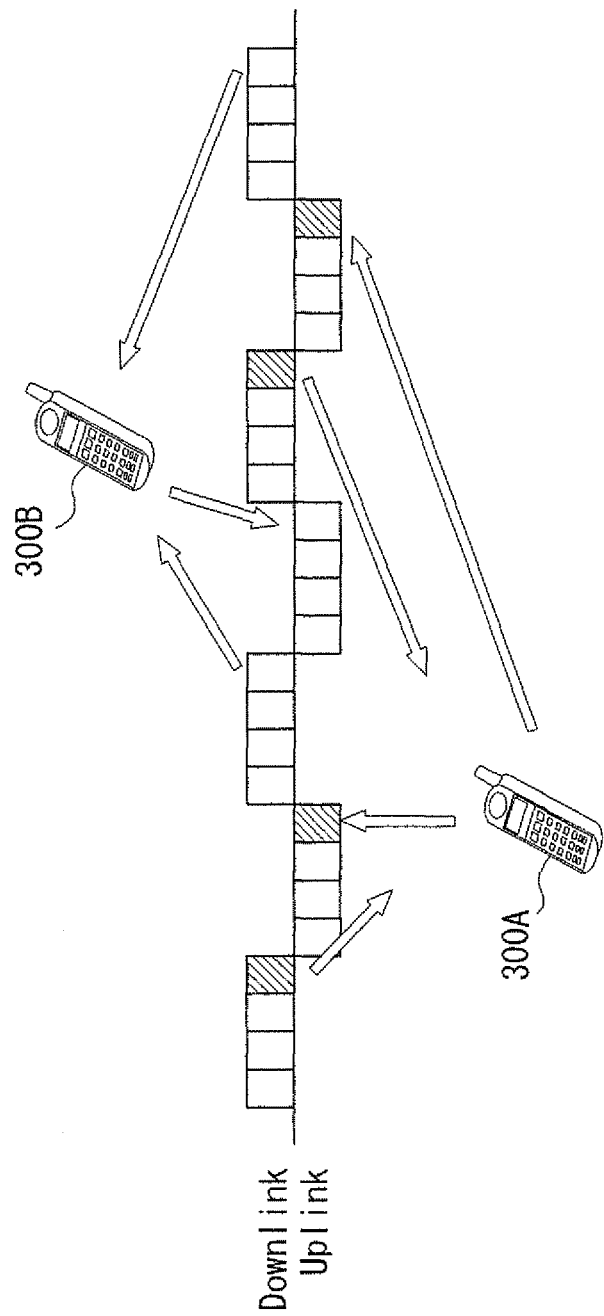
FIG. 4 is a diagram illustrating a frame structure when wireless communication apparatuses are performing wireless communications by using intermittently arranged time slots.

FIG. 4 is a diagram illustrating a frame structure when wireless communication apparatuses 300A, 300B are performing the wireless communication by using the time slots intermittently arranged. FIG. 4 shows double allocation in which two wireless communication apparatuses are performing the wireless communication by using the same time slots in alternate frames. According to the present invention, if the wireless communication apparatus 300A performs the wireless communication by using the time slots intermittently arranged and thereby there are time slots that can be allocated to another wireless communication apparatus, those time slots can be allocated to a wireless communication apparatus 300B newly requesting for a communication with the wireless base station apparatus 100. The wireless communication apparatuses to be allocated with the same time slots preferably have the same user rank and use the same application (communication type). Thereby, the wireless base station apparatus can simplify control to switch the wireless communication apparatuses in the same time slots.

Although the time slots are intermittently arranged in every other frame in the above embodiment, the present invention is applicable not only to that but to the time slots intermittently arranged in every several frames. In addition, more than two wireless communication apparatuses can use the same time slots.

It is preferred that, if it is determined that the wireless communication apparatus is under a good environment for the wireless communication and in a good communication state enough to set a high rate modulation class (modulation method) at step A15, the intermittent arrangement determination unit 115 informs the wireless resource allocation unit 111A of determination of an intermittent arrangement timing of the time slots to the wireless communication apparatus as well as informing the modulation method control unit 111B to determine change of the modulation class. Thereby, the wireless communication apparatus can prevent deterioration of wireless communication quality due to reduction of the time slots to use. The intermittent arrangement determination unit 115 may identify the communication type of the wireless communication apparatus based on a signal from the wireless communication apparatus, output from the modulation/demodulation unit 112, at the request for channel establishment from the wireless communication apparatus, and inform the wireless resource allocation unit 111A to determine intermittent arrangement of time slots to the wireless communication apparatus whose communication type is identified as a particular communication type such as VoIP (Voice over Internet Protocol), which is a fixed rate communication, real-time communication and the like and which is determined to have a value indicating the communication status of wireless communication exceeding the determination threshold.

According to the first embodiment of the present invention, as described above, if there are time slots that can be allocated to another wireless communication apparatus, the time slots can be allocated to a wireless communication apparatus for newly performing communications with the wireless base station apparatus in time slots intermittently allocated.

In addition, according to the first embodiment of the present invention, if there is a wireless communication apparatus which, among the wireless communication apparatuses currently in wireless communication, is under the good environment for wireless communication and capable of setting the high rate modulation method, allocation of the time slots is restricted after the modulation class of the wireless communication apparatus is reset to the high rate modulation method. Thereby other wireless communication apparatuses being connected can perform wireless communications with securing adequate data amounts according to the applications to use.

Moreover, according to the first embodiment of the present invention, the modulation class of the wireless communication apparatus performing the wireless communication at the fixed rate such as the VoIP and the real-time communication is reset to a high rate modulation method, which enables the wireless communication apparatus to perform the wireless communication with securing the adequate data amount according to the application to use.

Second Embodiment

Figure 5:
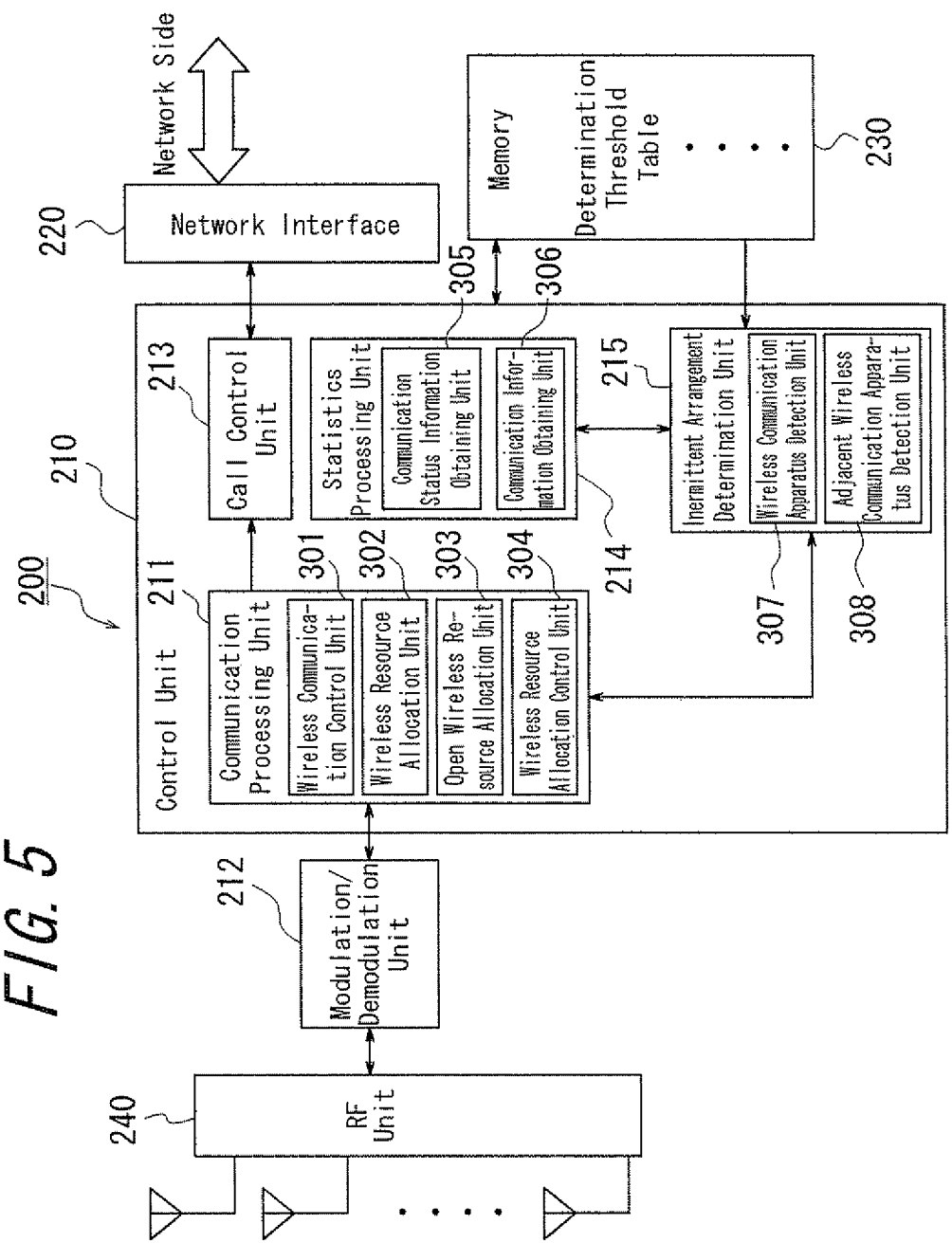
FIG. 5 is a block diagram illustrating a schematic constitution of a wireless base station apparatus according to a second embodiment of the present invention.

Next, a second embodiment of the present invention is described. FIG. 5 is a functional block diagram illustrating a schematic constitution of a wireless base station apparatus according to the second embodiment of the present invention. As shown in FIG. 5, the wireless base station apparatus 200 has an RE unit 240 including a switch (SW) to switch between transmission and reception, a control unit 210, a modulation/demodulation unit 212, a memory 230 for storing a table of determination threshold and a network interface 220 for connecting to an external network.

The control unit 210 has a communication processing unit 211, a call control unit 213, a statistics processing unit 214 and an intermittent arrangement determination unit 215. The communication processing unit 211 has a wireless communication control unit 301, a wireless resource allocation unit 302, an open wireless resource allocation unit 303 and a wireless resource allocation control unit 304. The statistics processing unit 214 has a communication status information obtaining unit 305 and a communication information obtaining unit 306. The intermittent arrangement determination unit 215 has a wireless communication apparatus detection unit 307 and an adjacent wireless communication apparatus detection unit 308.

The modulation/demodulation unit 212 modulates transmission signals to wireless communication apparatuses (not shown) and demodulates reception signals from the wireless communication apparatuses. The call control unit 213 performs call control in order to establish wireless channels with the wireless communication apparatuses.

The wireless resource allocation unit 302 (first wireless resource allocation unit) allocates time slots included in a communication frame to the wireless communication apparatuses. The wireless communication control unit 301 performs wireless communications with the wireless communication apparatuses by using the time slots allocated by the wireless resource allocation unit 302.

During the wireless communication, the communication status information obtaining unit 305 obtains information related to the communication status such as the received power, the fading speed, the frequency deviation and the like of the wireless communication apparatuses currently in communication. The wireless communication apparatus detection unit 307 (first wireless communication apparatus detection unit) detects a first wireless communication apparatus as a target of intermittent opening of time slots, based on the information obtained by the communication status information obtaining unit 305 and the table of the determination threshold stored in the memory 230.

The wireless resource allocation control unit 304 intermittently opens time slots for the first wireless communication apparatus detected by the wireless communication apparatus detection unit 307 at intervals of a predetermined number of frames. Thereby, the wireless base station apparatus can allocate such opened time slots to another wireless communication apparatus in connection and allocated with time slots adjacent to the opened time slots.

If the time slots for the first wireless communication apparatus are intermittently opened, the wireless communication control unit 301 may determine to change the modulation method for performing the wireless communication in unopened time slots to the modulation method with more modulation multi-values than that of the current modulation method, in order to transmit wireless signals to the first wireless communication apparatus detected by the wireless communication apparatus detection unit 307. In this case, upon determining to change the modulation method, the wireless communication control unit 301 instructs the modulation/demodulation unit 212 to change the modulation method. In response to such instruction by the wireless communication control unit 301, the modulation/demodulation unit 212 changes the modulation method for performing the wireless communication in the unopened time slots to the modulation method with more modulation multi-values than that of the current modulation method. Thereby, the wireless base station apparatus can allocate the opened time slots to another wireless communication apparatus in connection and allocated with time slots adjacent to the opened time slots, while maintaining the data rate necessary for wireless communication with the first wireless communication apparatus.

The adjacent wireless communication apparatus detection unit 308 (second wireless communication apparatus detection unit) detects a second wireless communication apparatus to which the time slots adjacent to the time slots opened by the wireless resource allocation control unit 304 are allocated.

The communication information obtaining unit 306 obtains information indicating the type of the communication with the second wireless communication apparatus detected by the adjacent wireless communication apparatus detection unit 308 and communication data amount information indicating a communication data amount of the second wireless communication apparatus.

The open wireless resource allocation unit 303 (second wireless resource allocation unit) allocates the opened time slots to the second wireless communication apparatus if each information obtained by the communication information obtaining unit 306 satisfies a predetermined condition.

Figure 6:
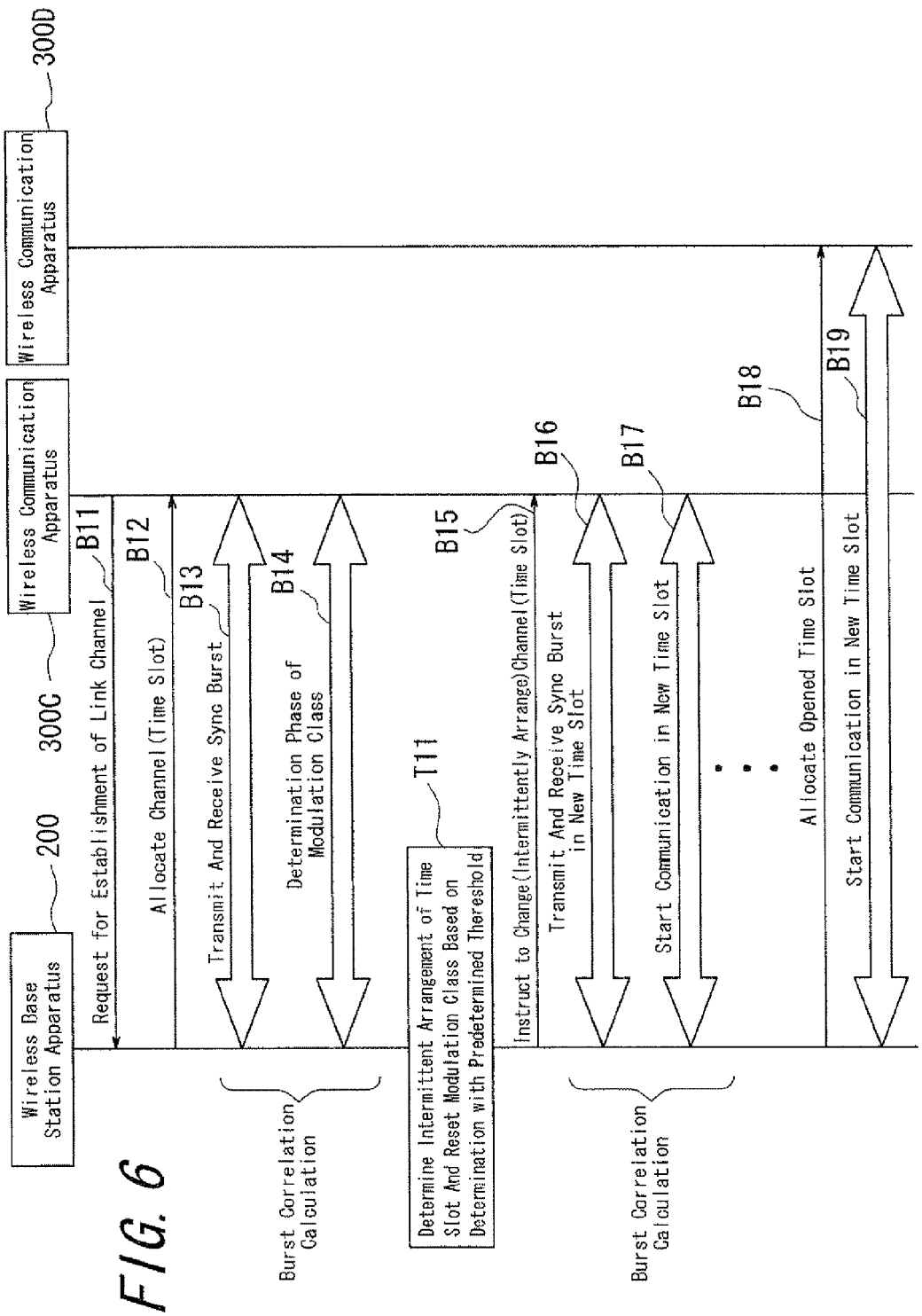
FIG. 6 is a sequence diagram illustrating operations of the wireless base station apparatus and wireless communication apparatuses.

FIG. 6 is a sequence diagram illustrating operations of the wireless base station apparatus and wireless communication apparatuses. In FIG. 6, the wireless base station apparatus 200 and the wireless communication apparatus (mobile station) 300D are communicating with each other.

When a wireless communication apparatus (mobile station) 300C transmits a signal requesting for establishment of a wireless channel to the wireless base station apparatus 200 (step B11), the call control unit 213 of the wireless base station apparatus 200 transmits a wireless channel (time slot) allocation signal to the wireless communication apparatus 300C (step B12). Next, the wireless base station apparatus 200 and the wireless communication apparatus 300C transmit and receive the sync burst signal on the channel (time slot) allocated (step B13).

When the wireless base station apparatus 200 receives the sync burst signal from the wireless communication apparatus 300C, the communication status information obtaining unit 305 of the statistics processing unit 214 obtains the information on the value related to the communication status of the wireless communication such as, for example, the received power of the sync burst signals received, the fading speed, the frequency deviation and the like, and performs statistics processing. The wireless communication apparatus detection unit 307 compares the value obtained by the communication status information obtaining unit 305 with the determination threshold stored in the memory 230 in order to determine whether it is possible to set a high rate modulation class (modulation method) for the wireless communication apparatus 300C. If determining that the wireless communication apparatus 300C is under the good environment for wireless communication and the value related to the communication status of the wireless communication indicates a good communication status enough to set the high rate modulation class (modulation method), the wireless communication apparatus detection unit 307 informs the communication processing unit 211 of a determination on the intermittent arrangement timing of the time slots for the wireless communication apparatus 300C, as well as instructing to change the modulation class (step T11).

Upon reception of notification of the intermittent arrangement timing, the wireless resource allocation control unit 304 of the communication processing unit 211 decides to open the time slots which have been allocated to the wireless communication apparatus 300C at intervals of a predetermined number of communication frames. The wireless communication control unit 301 transmits a channel switching (intermittent arrangement) instruction signal to the wireless communication apparatus 300C (step B15). In addition, the wireless communication control unit 301 decides to change the modulation method for performing the wireless communication in the unopened time slots to the modulation class (modulation method) with more modulation multi-values than that of the current modulation method and transmits a modulation class instruction signal to the wireless communication apparatus 300C as well as informing the modulation/demodulation unit 212 accordingly.

Next, the wireless base station apparatus 200 and the wireless communication apparatus 300C transmit and receive the sync burst signal by using the time slots intermittently arranged, and the wireless base station apparatus 200 determines whether it is possible to maintain the communication by using the time slots intermittently arranged (step B16). If it is possible to intermittently arrange the time slots, the wireless base station apparatus 200 and the wireless communication apparatus 300C starts communication in the time slots intermittently arranged (step B17).

Then, the adjacent wireless communication apparatus detection unit 308 of the wireless base station apparatus 200 detects the wireless communication apparatus 300D to which time slots adjacent to the time slots opened by the wireless resource allocation control unit 304 are allocated. The communication information obtaining unit 306 obtains, as communication information, information indicating the type of communication with the wireless communication apparatus 300D detected by the adjacent wireless communication apparatus detection unit 308 and communication data amount information indicating a communication data amount of the wireless communication apparatus 300D. The open wireless resource allocation unit 303 allocates the opened time slots to the wireless communication apparatus 300D if the information obtained by the communication information obtaining unit 306 indicates the communication type, such as the voice communication (VoIP), the real-time broadcast and the likes, for performing communication with a certain communication data amount (step B18). Alternatively, the open wireless resource allocation unit 303 may allocate the opened time slots to the wireless communication apparatus 300D if information obtained by the communication information obtaining unit 306 indicates that the communication type is for performing communication with a certain communication data amount, and that the communication data amount of the wireless communication apparatus 300D is less than the certain communication data amount. Thereafter, the wireless base station apparatus 200 and the wireless communication apparatus 300D perform the wireless communication by using the time slots which have been used by the wireless communication apparatus 300D and the opened time slot (time slot intermittently arranged) (step B19).

Figure 7:
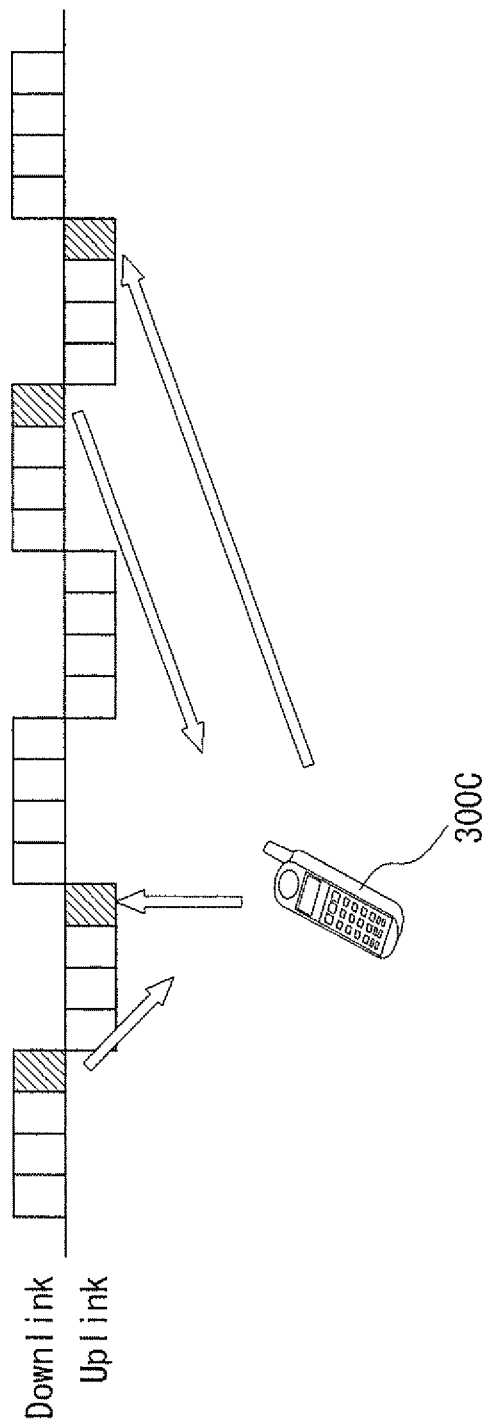
FIG. 7 is a diagram illustrating a frame structure when a wireless communication apparatus is performing the wireless communication by using intermittently arranged time slots.

FIG. 7 is a diagram illustrating a frame structure when the wireless communication apparatus 300C is performing the wireless communication by using the time slots intermittently arranged. As shown in FIG. 7, the wireless communication apparatus 300C is performing the wireless communication by using the time slot in every other frame, which means that there is an allocatable time slot in every other frame. Accordingly, intermittent arrangement causes allocatable time slots, thus the wireless base station apparatus can allocate the opened time slots in the frames at predetermined intervals to another wireless communication apparatus in addition to the time slots used thereby.

Figure 8:
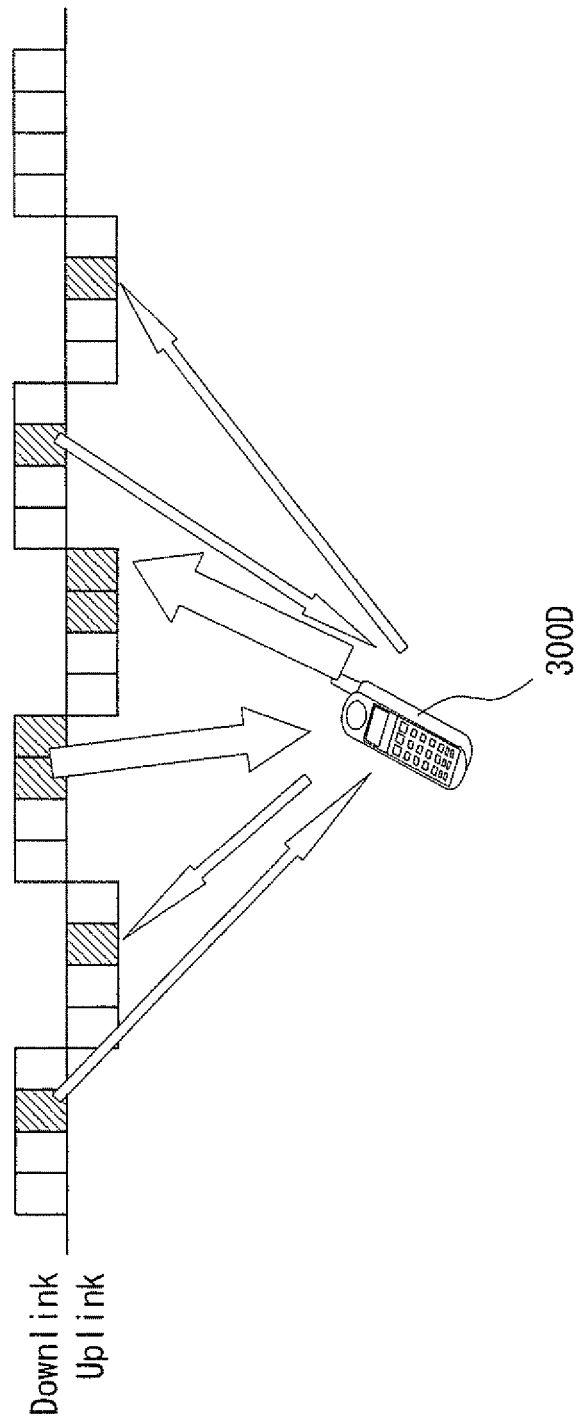
FIG. 8 is a diagram illustrating a frame structure when a wireless communication apparatus is performing the wireless communication by using intermittently arranged time slot newly assigned thereto.
Figure 9:
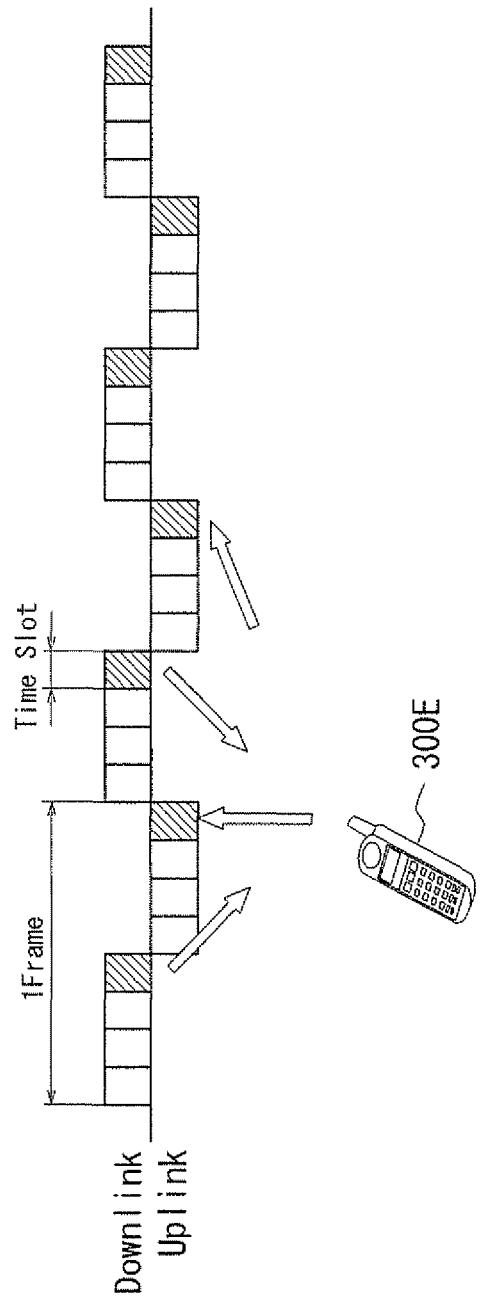
FIG. 9 is a diagram illustrating a frame structure.

FIG. 8 is a diagram illustrating a frame structure when the wireless communication apparatus 300D is performing the wireless communication by using both the time slots to allocated the wireless communication apparatus 300D and the time slots intermittently arranged which are newly allocated. Accordingly, since the wireless communication apparatus 300D can also use the time slots intermittently arranged which are newly opened, it is possible to perform the wireless communication with securing the adequate data amount in accordance with the application to use.

Since the time slots already allocated to the wireless communication apparatus 300D and the time slots intermittently arranged which are newly allocated are adjacent to each other, the wireless base station apparatus may connect those two adjacent time slots. Connection of two time slots reduces one preamble section of transmission and reception signals, which allows the wireless communication apparatus 300D to increase the data amount to transmit and receive as much as a size of the preamble section reduced.

According to the second embodiment of the present invention, as described above, if there is a wireless communication apparatus under a good environment for the wireless communication among the wireless communication apparatuses currently being in the wireless communication, allocation of time slots to this wireless communication apparatus is restricted while the wireless communication therewith is maintained, in order to allocate the opened time slots to another wireless communication apparatus being connected. Thereby, the wireless communication apparatus being connected can perform the wireless communication with securing the adequate data amount in accordance with the application to use.

Moreover, according to the second embodiment of the present invention, if a certain communication rate cannot be secured, adjacent time slots are connected and then allocated to the wireless communication apparatus being connected, which enables the wireless communication apparatus being connected to perform the wireless communication with securing the adequate data amount in accordance with the application to use.

Although the above embodiments describe the wireless base station apparatus for performing wireless communications with a plurality of wireless communication apparatuses by using Time Division Multiple Access scheme, the present invention can also be implemented in a wireless base station apparatus for performing wireless communications with a plurality of wireless communication apparatuses by using Frequency Division Multiple Access scheme. That is, although the above embodiments use time slot as the wireless resource, if the wireless base station apparatus performs wireless communication by using the Frequency Division Multiple Access scheme, subcarriers or resource blocks can be used as the wireless resource.

Although the present invention is described as apparatuses in the above embodiments, it is to be understood that the present invention may be implemented by a communication method, a program, a storage medium storing the program which are substantially equivalent to the apparatuses, and that they are included in the scope of the present invention. Each step of the communication method and the program may use an arithmetic processing unit such as a CPU, a DSP and the like in data processing as necessary, and input data and processed or generated data are stored in a storage device such as an HDD, a memory and the like.

In addition, although the present invention is described based on the figures and the embodiments, it is to be noted that those skilled in the art may easily modify or vary them in a multiple of manners based on the present disclosure. Accordingly, such variation and modification are included in the scope of the present invention. For example, functions and the like included in each means, each step and the like can be rearranged avoiding logical discrepancy, and a plurality of means and steps can be combined or, alternatively, the means and the step can be divided.

The invention claimed is:

1. A wireless base station apparatus for performing wireless communication with a plurality of wireless communication apparatuses comprising:
   a wireless resource allocation unit for allocating wireless resources to the wireless communication apparatuses to perform wireless communication;
   an information obtaining unit for obtaining information related to communication status of the wireless communication apparatuses in wireless communication; and
   a detection unit for detecting a wireless communication apparatus as a target to allocate wireless resource at intervals of a predetermined number of communication frames based on the information obtained by the information obtaining unit, wherein
   the wireless resource allocation unit intermittently allocates same wireless resource at intervals of a predetermined number of communication frames to a plurality of wireless communication apparatuses detected by the detection unit.

2. The wireless base station apparatus according to claim 1, wherein the wireless resource allocation unit, when receiving a request for channel establishment from the wireless communication apparatus, allocates wireless resource at intervals of a predetermined number of communication frames to the wireless communication apparatus based on a communication type of the wireless communication apparatus.

3. The wireless base station apparatus according to claim 2, wherein the wireless resource allocation unit, in accordance with a specified communication rate included in the communication type, allocates the wireless resource to the wireless communication apparatus at the specified communication rate.

4. The wireless base station apparatus according to claim 2, wherein the wireless resource allocation unit allocates same wireless resource to a plurality of wireless communication apparatuses of the same communication type.

5. The wireless base station apparatus according to claim 1, further comprising a modulation method control unit for changing a modulation method of wireless communication to be performed with wireless resource allocated to a modulation method capable of obtaining a communication rate higher than that of a modulation method of wireless communication before allocation of the wireless resource, if the wireless resource allocation unit allocates the wireless resource at intervals of a predetermined number of communication frames to the wireless communication apparatus in wireless communication.

6. A wireless communication method of a wireless base station apparatus for performing wireless communication with a plurality of wireless communication apparatuses comprising the steps of
   allocating wireless resources to the wireless communication apparatuses to perform wireless communication;
   obtaining information related to communication status of the wireless communication apparatuses in wireless communication;
   detecting a wireless communication apparatus to be allocated with wireless resource at intervals of a predetermined number of communication frames based on the information obtained at the step of obtaining information; and
   controlling so as to intermittently allocate same resource at intervals of a predetermined number of communication frames to a plurality of wireless communication apparatuses detected at the step of detection.

7. A base station apparatus for performing wireless communication with a plurality of wireless communication apparatuses comprising:
   a first wireless resource allocation unit for allocating wireless resources included in a communication frame to the wireless communication apparatuses;
   a wireless communication control unit for performing the wireless communication with the wireless communication apparatuses by using the wireless resources allocated by the first wireless resource allocation unit;
   a communication status information obtaining unit for obtaining information related to communication status of the wireless communication apparatuses currently in communication when the wireless communication is performed by the wireless communication control unit;
   a first wireless communication apparatus detection unit for detecting a first wireless communication apparatus as a target of intermittent opening of the wireless resource based on the information obtained by the communication status information obtaining unit;
   a wireless resource allocation control unit for intermittently opening the wireless resource at intervals of a predetermined number of communication frames for the first wireless communication apparatus detected by the first wireless communication apparatus detection unit;
   a second wireless communication apparatus detection unit for detecting a second wireless communication apparatus allocated with wireless resource adjacent to the wireless resource opened by the wireless resource allocation control unit;
   a communication information obtaining unit for obtaining information indicating a communication type of the second wireless communication apparatus detected by the second wireless communication apparatus detection unit and communication data amount information indicating a communication data amount of the second wireless communication apparatus; and
   a second wireless resource allocation unit for allocating the wireless resource opened to the second wireless communication apparatus if each of the information obtained by the communication information obtaining unit satisfies a predetermined condition.

8. The wireless base station apparatus according to claim 7, wherein the predetermined condition is satisfied if, at least, the communication type is for performing communication with a certain communication data amount.

9. The wireless base station apparatus according to claim 8, wherein the communication type for performing communication with a certain communication data amount is voice communication.

10. The wireless base station apparatus according to claim 8, wherein the communication type for performing communication with a certain communication data amount is real-time broadcasting.

11. The wireless base station apparatus according to claim 7, wherein the predetermined condition is satisfied if, at least, the communication type is for performing communication with a certain communication data amount and the communication data amount of the second wireless communication apparatus is less than the certain communication data amount.

12. A wireless communication method of a wireless base station apparatus for performing wireless communication with a plurality of wireless communication apparatuses comprising the steps of:

allocating wireless resources included in a communication frame to the wireless communication apparatuses;

performing the wireless communication with the wireless communication apparatuses by using the wireless resources allocated;

obtaining information related to communication status of the wireless communication apparatuses currently in communication when the wireless communication is performed;

detecting a first wireless communication apparatus as a target of intermittent opening of the wireless resource based on the information related to the communication status obtained;

intermittently opening the wireless resource at intervals of a predetermined number of communication frames for the first wireless communication apparatus detected;

detecting a second wireless communication apparatus allocated with wireless resource adjacent to the wireless resource opened;

obtaining information indicating a communication type of the second wireless communication apparatus detected and communication data amount information indicating a communication data amount of the second wireless communication apparatus; and allocating the wireless resource opened to the second wireless communication apparatus if each of the information obtained satisfies a predetermined condition.

\* \* \* \* \*